US011292515B2

(12) United States Patent
Thoreson

(10) Patent No.: US 11,292,515 B2
(45) Date of Patent: Apr. 5, 2022

(54) COMPACT STEERING ASSEMBLY

(71) Applicant: DEERE & COMPANY, Moline, IL (US)

(72) Inventor: Curtis P. Thoreson, Janesville, IA (US)

(73) Assignee: DEERE & COMPANY, Moline, IL (US)

(*) Notice: Subject to any disclaimer, the term of this patent is extended or adjusted under 35 U.S.C. 154(b) by 6 days.

(21) Appl. No.: 16/832,447

(22) Filed: Mar. 27, 2020

(65) Prior Publication Data
US 2021/0300467 A1 Sep. 30, 2021

(51) Int. Cl.
B62D 7/16 (2006.01)
B62D 7/18 (2006.01)
F16C 11/08 (2006.01)
B62D 3/02 (2006.01)

(52) U.S. Cl.
CPC ............... B62D 7/166 (2013.01); B62D 3/02 (2013.01); B62D 7/18 (2013.01); F16C 11/08 (2013.01)

(58) Field of Classification Search
CPC ... B62D 3/02; B62D 7/18; B62D 3/12; B62D 5/22; B62D 7/166; F16C 11/08
USPC .................................................... 280/93.514
See application file for complete search history.

(56) References Cited

U.S. PATENT DOCUMENTS 4,521,141 A * 6/1985 Abe .................. B23F 15/00
409/48
5,839,845 A 11/1998 Kincaid et al.
6,257,795 B1 * 7/2001 Stroh ....................... B62D 7/16
280/93.511
6,402,169 B1 * 6/2002 Schafer ..................... B60G 3/20
280/124.136
6,422,779 B1 * 7/2002 Spagnuolo ............... B62D 3/12
403/138

(Continued)

FOREIGN PATENT DOCUMENTS

CH        424501 A    11/1966
DE    10107449 A1     9/2002
DE    60131230 T2     9/2008

OTHER PUBLICATIONS

German Search Report issued in application No. DE102021201631.6, dated Dec. 3, 2021, 10 pages.

Primary Examiner — Paul N Dickson
Assistant Examiner — Caitlin Anne Miller
(74) Attorney, Agent, or Firm — Michael Best & Friedrich LLP

(57) ABSTRACT

A work vehicle includes a chassis defining a longitudinal axis, a prime mover configured to move the chassis in the direction of the longitudinal axis, and a steering assembly configured to pivot a wheel relative to the chassis. The steering assembly includes a knuckle coupled to the wheel, a tie rod coupled to the knuckle and having a ball portion, a steering cylinder, and a joint assembly. The steering cylinder is slidably coupled to the chassis and configured to translate relative to the chassis along a cylinder axis perpendicular to the longitudinal axis. The steering cylinder includes a connection portion having an inner circumferential surface that partially defines a bearing pocket. The joint assembly couples the ball portion to the connection portion and includes a bearing race that is received into the bearing pocket in direct contact with the inner circumferential surface. The bearing race receives the ball portion.

14 Claims, 6 Drawing Sheets

(56) References Cited

U.S. PATENT DOCUMENTS

| | | | |
|---|---|---|---|
| 8,814,185 B2 * | 8/2014 | Luttinen | B60G 3/20 280/86.758 |
| 2003/0053853 A1 | 3/2003 | Wasylewski et al. | |
| 2007/0163100 A1 | 7/2007 | Schmidt et al. | |

* cited by examiner

COMPACT STEERING ASSEMBLY

BACKGROUND

The present disclosure relates to steering assemblies for work vehicles.

SUMMARY

In one embodiment, the disclosure provides a work vehicle that includes a chassis defining a longitudinal axis, a prime mover configured to move the chassis along a ground surface in the direction of the longitudinal axis, and a steering assembly configured to pivot a wheel relative to the chassis about a steering axis. The steering assembly includes a knuckle coupled to the wheel, a tie rod coupled to the knuckle and having a ball portion, a steering cylinder, and a joint assembly. The steering cylinder is slidably coupled to the chassis and configured to translate relative to the chassis along a cylinder axis perpendicular to the longitudinal axis. The steering cylinder includes a connection portion having an inner circumferential surface that at least partially defines a bearing pocket. The joint assembly couples the ball portion to the connection portion and includes a bearing race that is received into the bearing pocket in direct contact with the inner circumferential surface. The bearing race receives the ball portion.

In another embodiment, the disclosure provides a steering subassembly that includes a steering cylinder positionable within a barrel of a chassis of a vehicle and configured to translate along an axis concentric with the barrel. The steering cylinder includes a connection portion having a seal pocket, an internally threaded portion, and a bearing pocket located between the seal pocket and the internally threaded portion and at least partially defined by an inner circumferential surface.

In another embodiment, the disclosure provides a work vehicle that includes a chassis defining a longitudinal axis, a prime mover configured to move the chassis along a ground surface in the direction of the longitudinal axis, and a steering assembly configured to pivot a wheel relative to the chassis about a steering axis. The steering assembly includes a knuckle coupled to the wheel, a tie rod coupled to the knuckle and having a ball portion, a steering cylinder, a seal member, first and second cup races, and a retaining nut. The steering cylinder is slidably coupled to the chassis and configured to translate relative to the chassis along a cylinder axis perpendicular to the longitudinal axis. The steering cylinder includes a connection portion having a seal pocket, an internally threaded portion, and a bearing pocket defined by an inner circumferential surface and a shoulder of the connection portion. The seal member is received into the seal pocket. The first and second cup races are received into the bearing pocket in direct contact with the inner circumferential surface, with the first cup race further in contact with the shoulder. The ball portion is captured between the first and second cup races. The retaining nut is received into the internally threaded portion.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
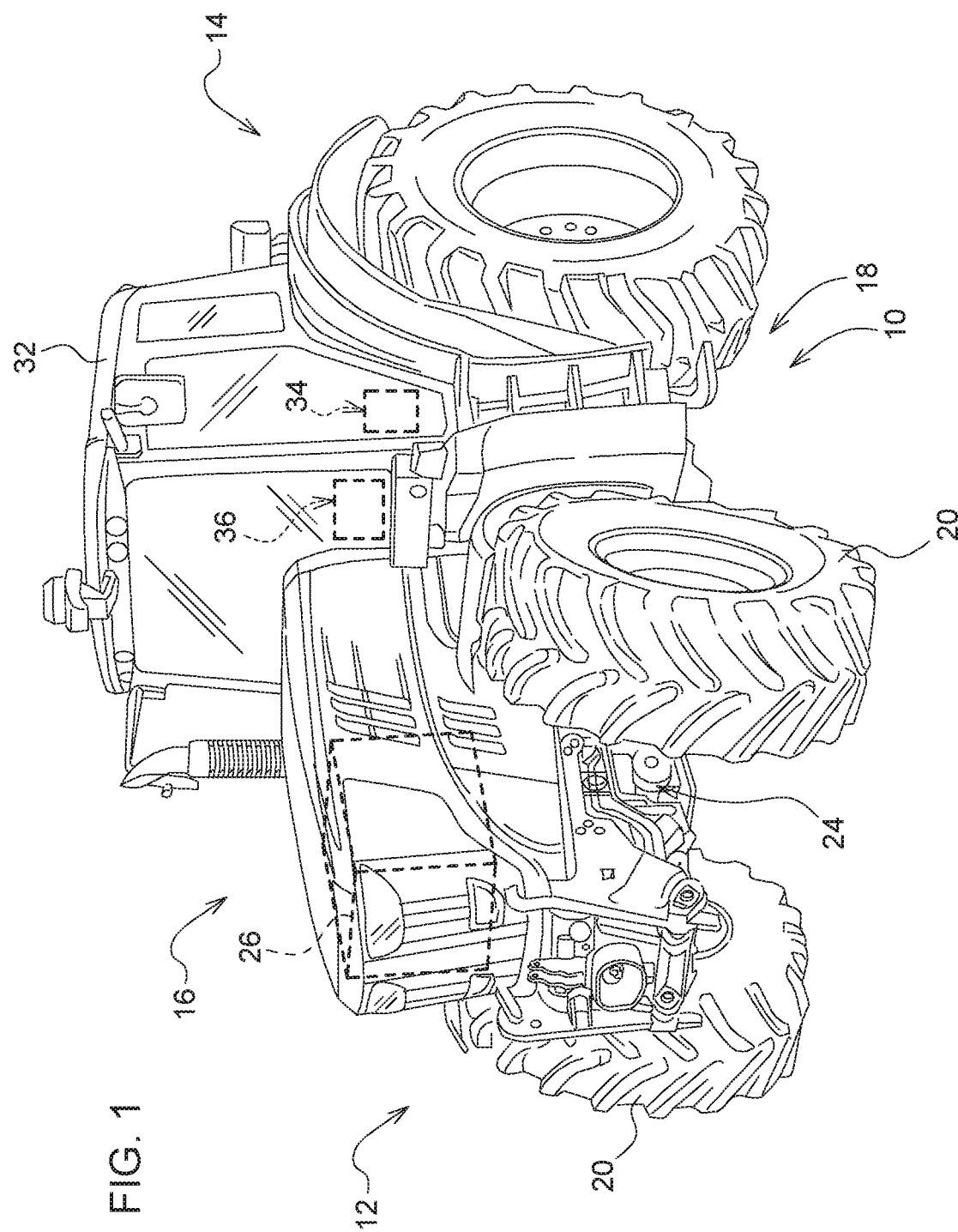
FIG. 1 is a perspective view of a work vehicle.

FIG. 1 illustrates a work vehicle 10 including a front portion 12, a rear portion 14, a first side portion 16, a second side portion 18, front wheels 20, a chassis 24, a prime mover 26, a cab 32, a controller 34, and a user interface 36. The front wheels 20 are connected to the chassis 24 proximate the front portion 12. While front wheels 20 are illustrated, other ground-engaging implements, such as tracks, can be utilized.

The prime mover 26 is coupled to the chassis 24 proximate the front portion 12 and configured to provide power to the front wheels 20 to thereby move the work vehicle 10 over a ground surface.

The cab 32 is connected to the chassis 24 proximate the rear portion 14. The controller 34 can be positioned in or near the cab 32 and is electrical communication with the front wheels 20 and the prime mover 26 to send and receive signals from the front wheels 20 and the prime mover 26.

The user interface 36 is located in the cab 32 such that an operator positioned in the cab 32 can engage the user interface 36, which is in electrical communication with the controller 34 to send and receive signals.

Figure 2:
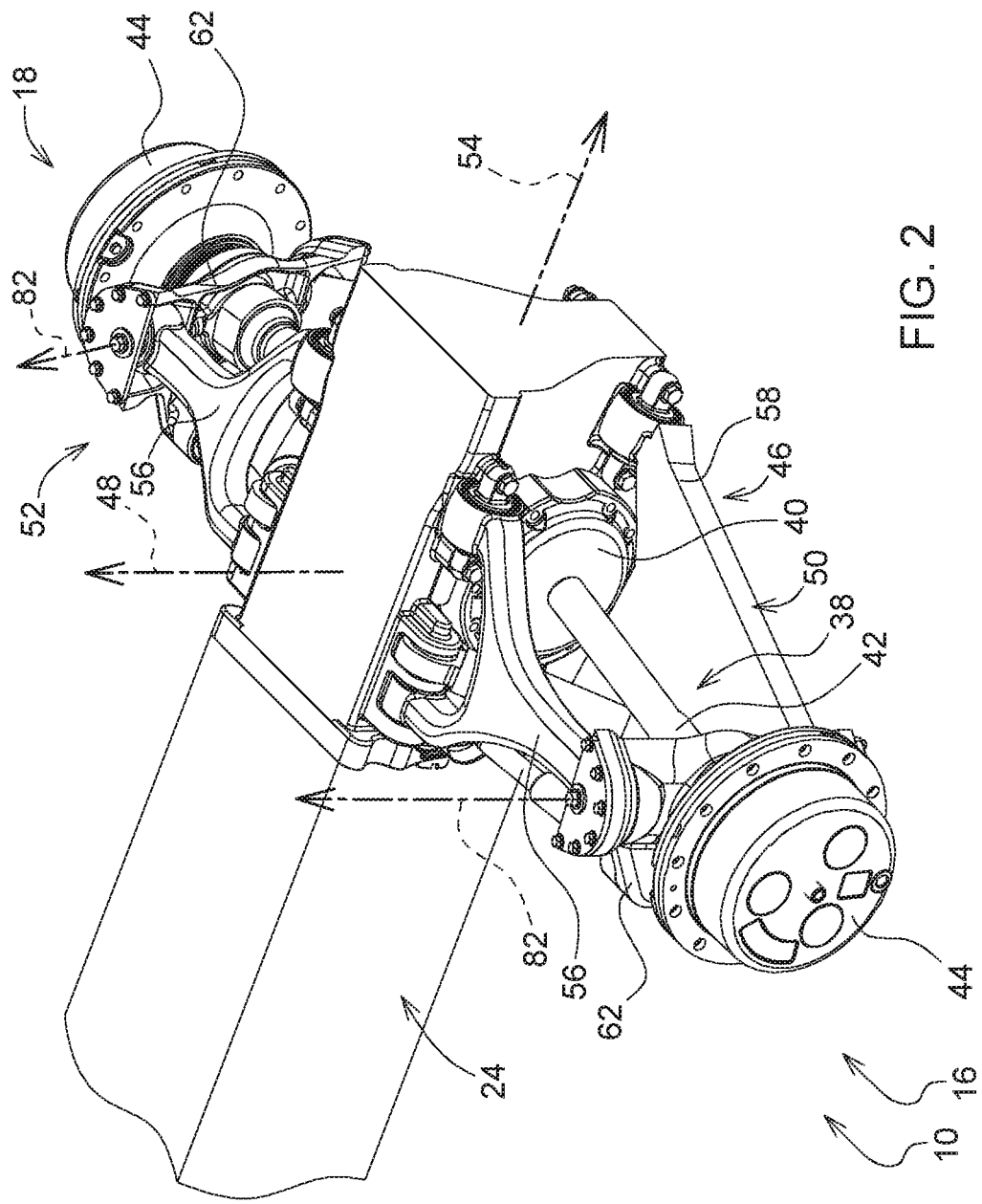
FIG. 2 is a first side perspective view of a portion of the work vehicle of FIG. 1.
Figure 3:
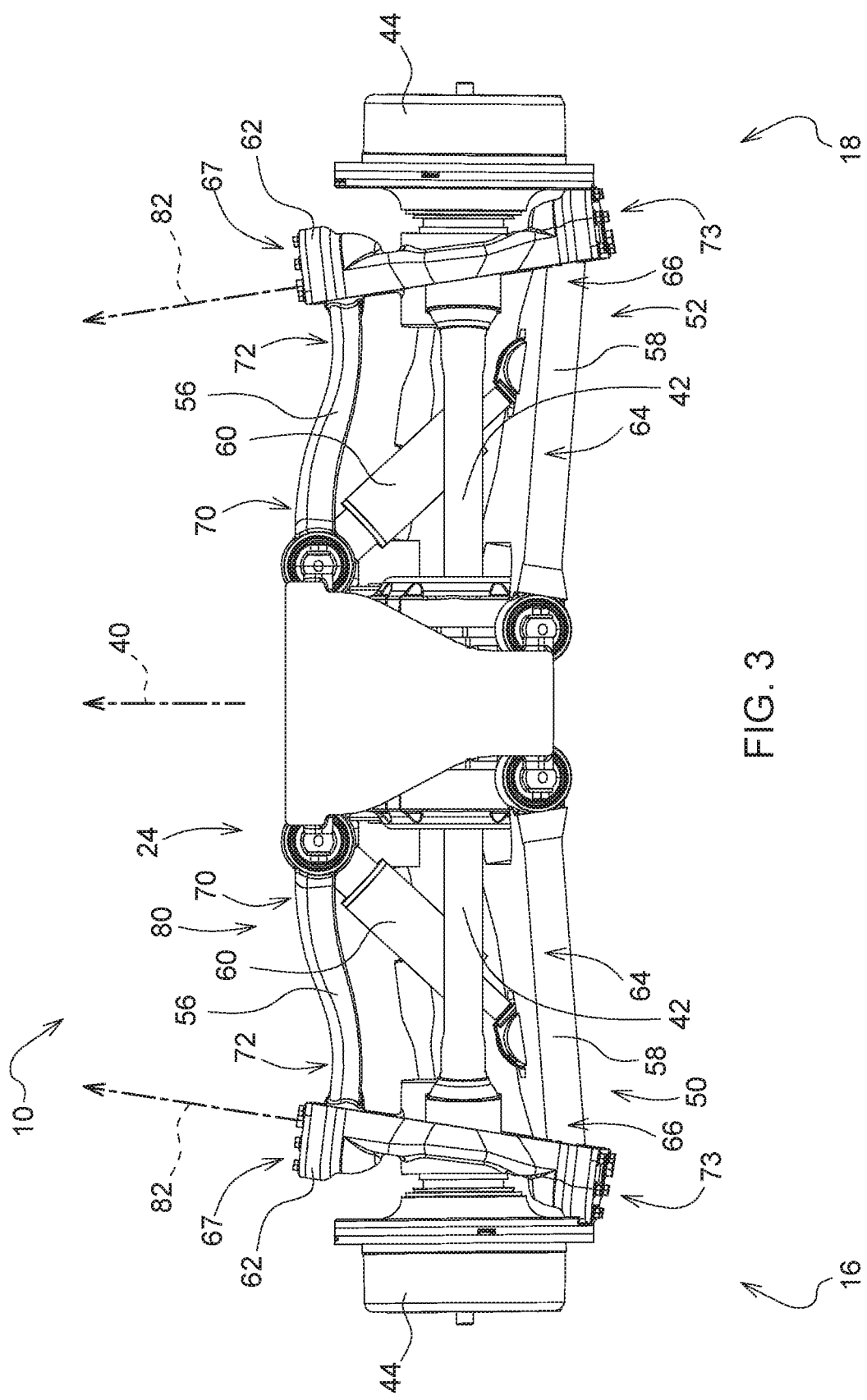
FIG. 3 is a front view of the portion of the work vehicle shown in of FIG. 2.

With reference to FIGS. 2 and 3, the work vehicle 10 includes a drivetrain 38 that delivers torque from the prime mover 26 to the front wheels 20. The drivetrain 38 includes the prime mover 26 (FIG. 1), a gearbox 40 coupled to the prime mover 26, an axle shaft 42 that extends from the gearbox 40 at each of the first and second side portions 16, 18, and a wheel hub 44 coupled to each axle shaft 42.

The work vehicle 10 also includes a suspension assembly 46 that connects the front wheels 20 (FIG. 1) to the chassis 24. The suspension assembly 46 permits vertical movement of the chassis 24 relative to the front wheels 20 along a vertical axis 48 extending generally orthogonal to the ground surface (not shown). The illustrated suspension assembly 46 is an independent link suspension assembly 46 that includes a first side subassembly 50 and a second side subassembly 52. The first and second side subassemblies 50, 52 are substantially mirror-images of one another about a longitudinal axis 54 of the work vehicle 10.

With continued reference to FIGS. 2 and 3, the first and second side subassemblies 50, 52 of the suspension assembly 46 each include a first suspension arm or upper control arm 56, a second suspension arm or lower control arm 58, a suspension cylinder 60 (FIG. 3), and a steering knuckle 62.

Each steering knuckle 62 rotatably supports a respective wheel hub 44, and each wheel hub 44 is coupled to each respective axle shaft 42 for co-rotation therewith. Each front wheel 20 attaches to a respective wheel hub 44 at each of the first and second side portions 16, 18. In this manner, the suspension assembly 46 is connected to each front wheel 20—via each wheel hub 44 supported by each respective steering knuckle 62.

Figure 4:
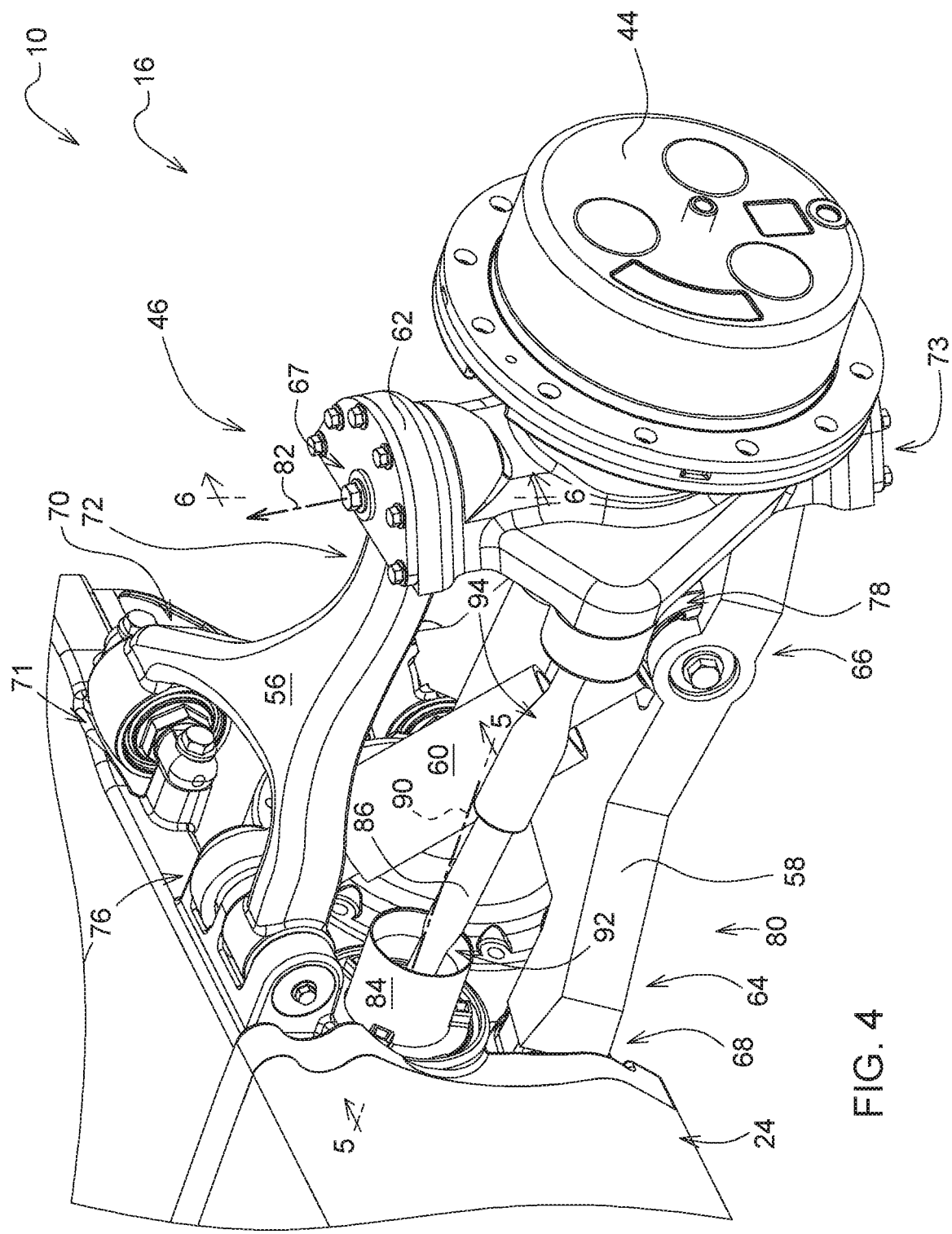
FIG. 4 is a close up rear perspective view of the portion of the work vehicle shown in FIG. 2.

With reference to FIG. 4, each lower control arm 58 includes a lower arm first portion 64 coupled to the chassis 24 and a lower arm second portion 66 opposite the lower arm first portion 64 and pivotably coupled to the steering knuckle 62 via a first or lower ball joint assembly 73. The lower arm first portion 64 is rotatably coupled to the chassis 24 (e.g., via a pinned connection) at a lower arm mount 68, so that the lower arm second portion 66 can swing about the lower arm mount 68 during operation of the work vehicle 10.

Each upper control arm 56 similarly includes an upper arm first portion 70 coupled to the chassis 24 and an upper arm second portion 72 opposite the upper arm first portion 70 and pivotably coupled to the steering knuckle 62 via a second or upper ball joint assembly 67. The upper arm first portion 70 is likewise rotatably coupled to the chassis 24 (e.g., via a pinned connection) at an upper arm mount 74, so that the upper arm second portion 72 can swing about the upper arm mount 74 during operation of the work vehicle 10.

Each suspension cylinder 60 is an elongated member that extends between a first or cylinder portion 76 coupled to the chassis 24, and a second or rod portion 78 coupled to the lower control arm 58. The suspension cylinder 60 is configured to extend or retract in length between the cylinder portion 76 and the rod portion 78 (e.g., via hydraulic actuation).

In operation, when the suspension cylinder 60 is actuated to extend in length, the suspension cylinder 60 exerts a force on the lower control arm 58. The exerted force causes the lower arm second portion 66 to swing about the lower arm mount 68 so that the chassis 24 substantially rises along the vertical axis 48 (FIG. 2) relative to the front wheels 20 and to the ground surface. Similarly, when the suspension cylinder 60 is actuated to retract in length, a weight of the chassis 24 causes the lower arm second portion 66 to swing about the lower arm mount 68 so that the chassis 24 substantially lowers along the vertical axis 48 relative to the front wheels 20 and to the ground surface.

With reference to FIGS. 3 and 4, the work vehicle 10 includes a steering assembly 80 configured to perform coordinated movements of the front wheels 20 (FIG. 1) to steer the work vehicle 10. The steering assembly 80 engages each front wheel 20 to pivot each front wheel 20 about a respective steering axis 82 defined by the upper and lower ball joint assemblies 67, 73.

The illustrated steering assembly 80 includes a steering cylinder 84 and a tie rod 86 coupled to each respective side of the steering cylinder 84. The steering cylinder 84 is slidably supported within a barrel 88 affixed to the chassis 24 and configured to translate toward or away from each side portion 16, 18 along a cylinder axis 90 substantially perpendicular to the longitudinal axis 54. Each tie rod 86 includes a first or inner tie rod portion 92 coupled to a respective side of the steering cylinder 84, and a second or outer tie rod portion 94 coupled to the steering knuckle 62. In some embodiments (not shown), a length of each tie rod 86 may be adjustable to facilitate proper alignment of the front wheels 20.

Figure 5:
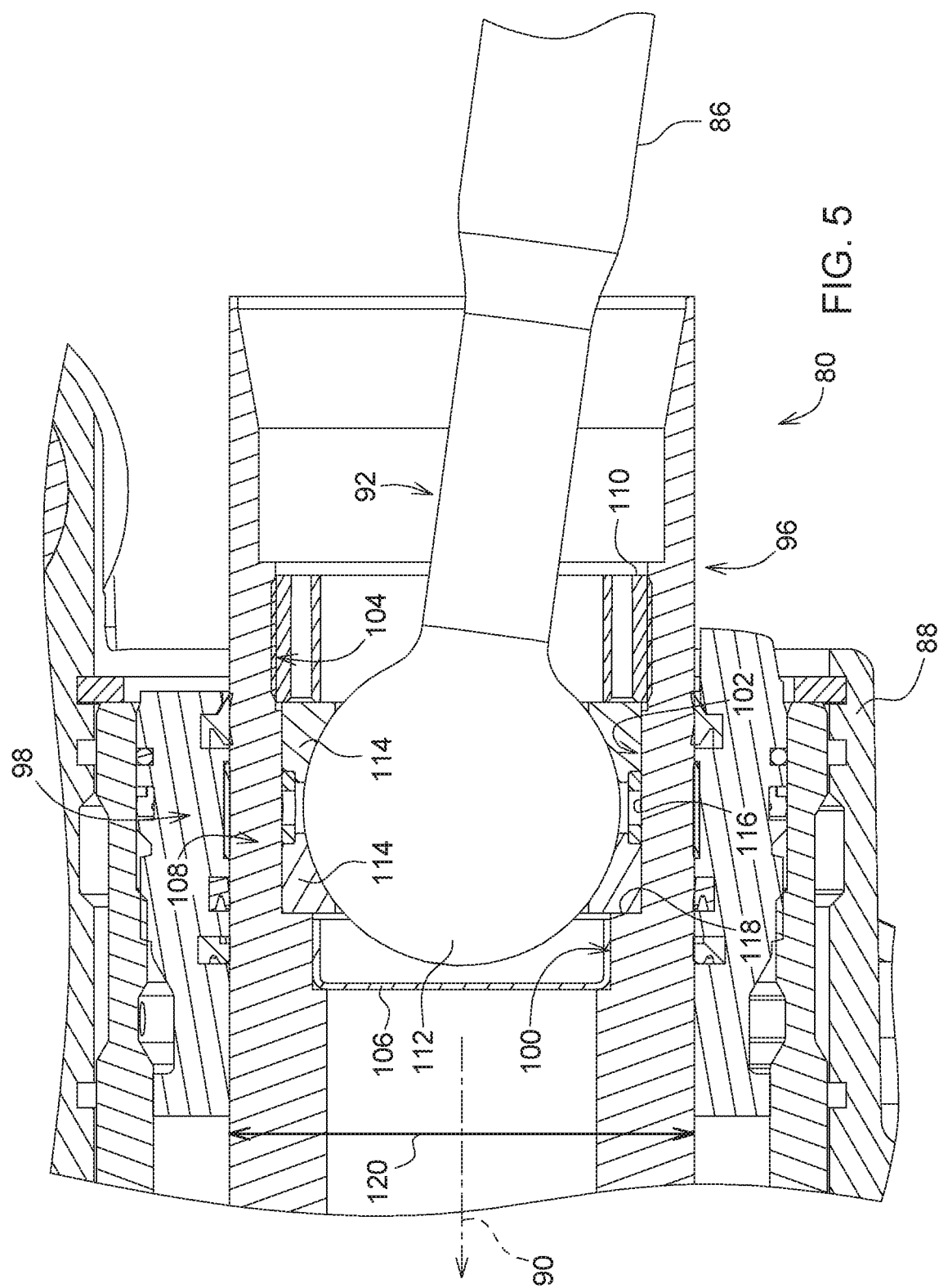
FIG. 5 is a close up cross-sectional view of the portion of the work vehicle shown in FIG. 2, taken along line 5-5 of FIG. 4.

With reference to FIG. 5, in the illustrated embodiment, the steering cylinder 84 defines a connection portion 96 at each respective side thereof. The steering assembly 80 further includes a spherical joint assembly 98 that pivotably couples the inner tie rod portion 92 of each tie rod 86 to the respective connection portion 96 of the steering cylinder 84.

Each connection portion 96 defines a seal pocket 100, a bearing pocket 102 located outboard the seal pocket 100 with respect to the longitudinal axis 54, and an internally threaded portion 104 located outboard the bearing pocket 102. The joint assembly 98 includes a seal member 106, a bearing 108, a retaining nut 110, and a ball portion 112 defined by the inner tie rod portion 92.

The seal member 106 is received into the seal pocket 100 to retain a lubricant (not shown) within the connection portion 96. In the illustrated embodiment, the bearing 108 is formed as a spherical bearing 108 having a pair of cup races 114 that are received into the bearing pocket 102. The cup races 114 capture the ball portion 112 of the inner tie rod portion 92 therebetween. The retaining nut 110 threads into the internally threaded portion 104 to secure the bearing 108 within the bearing pocket 102. The retaining nut 110 can be tightened to preload the cup races 114 with a compressive preload force exerted on the ball portion 112. In some embodiments, a sleeve (not shown) is positioned between the cup races 114 to limit the preload force to a predetermined value.

With continued reference to FIG. 5, the bearing pocket 102 of each connection portion 96 is defined by an inner circumferential bearing surface 116 and a pocket shoulder 118. Each cup race 114 sits in direct contact with the circumferential bearing surface 116 of the connection portion 96, and one of the cup races 114 further abuts the pocket shoulder 118 to axially locate the cup race 114 (relative to cylinder axis 90) within the connection portion 96. In contrast, some traditional steering assemblies (not shown) include a unitized tie rod having an intermediate housing that supports the joint assembly at the inner tie rod portion, with the associated ball and cup races contained within the intermediate housing. In such traditional steering assemblies, the intermediate housing is insertable into the connection portion of the steering cylinder. By eliminating an intermediate housing and instead forming the bearing pocket 102 directly within the connection portion 96, an outside diameter 120 of the steering cylinder 84 can be reduced as compared to that of such traditional steering cylinders. The relative reduction of the outside diameter 120 of the steering cylinder 84 can be achieved without reducing the relative sizes of the components of the joint assembly 98 (e.g., the ball portion 112, the cup races 114, etc.), thus maintaining an overall robustness of the steering assembly 80.

The relative compactness of the steering cylinder 84 frees up space at the front portion 12 (FIG. 1) of the work vehicle 10, which can subsequently be devoted to other purposes, e.g., for permitting a wider turn radius for the wheels 20, sizing cooling components to improve cooling capacity of the work vehicle 10, or adding further features to the work vehicle. Additionally or alternatively, an overall vehicle envelope of the work vehicle 10 can be reduced as a result of the relative compactness of the steering cylinder 84.

Figure 6:
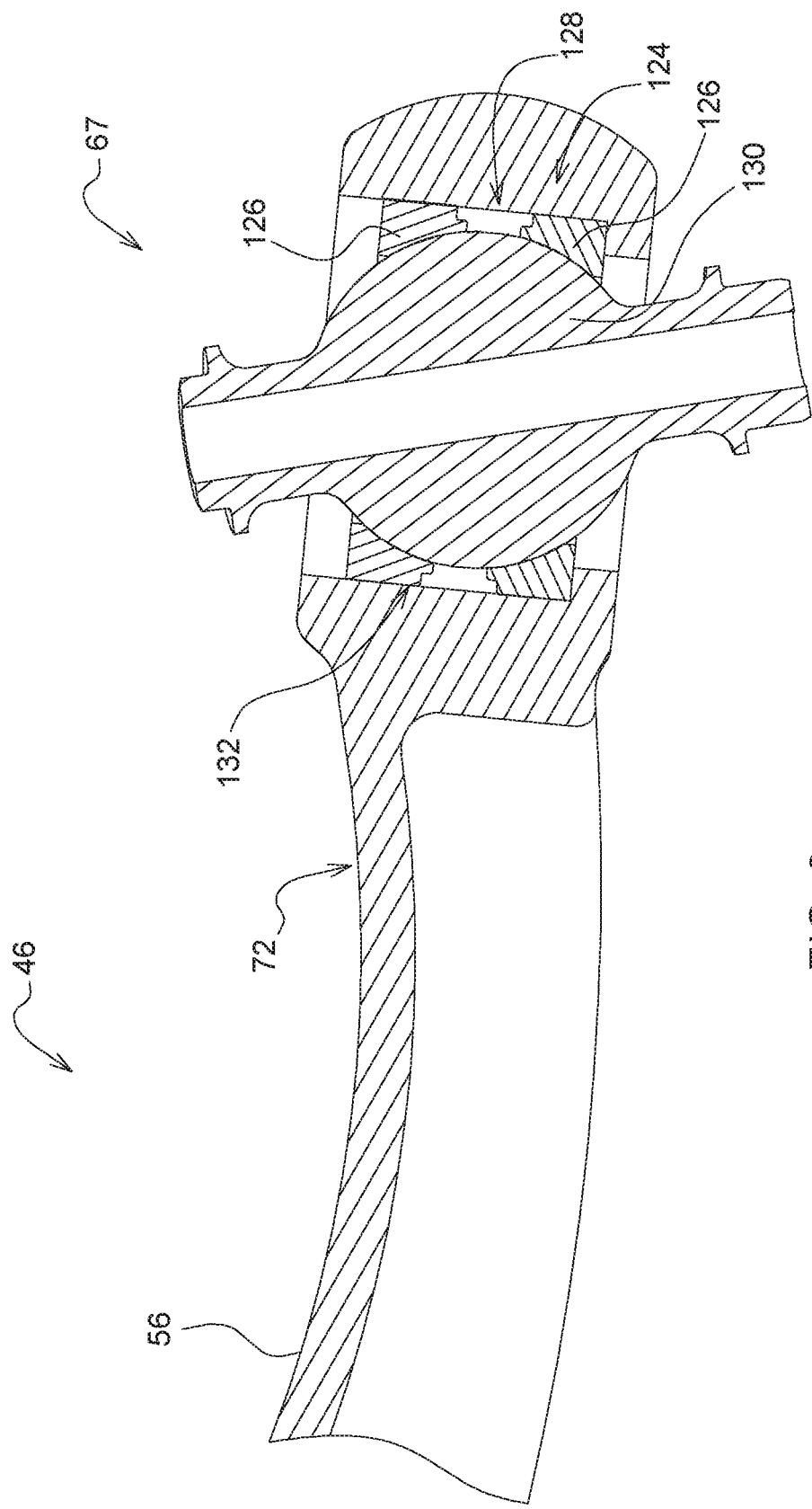
FIG. 6 is a close up cross-sectional perspective view of the portion of the work vehicle shown in FIG. 2, taken along line 6-6 of FIG. 4.

With reference to FIGS. 4 and 6, similar joint assemblies can be utilized elsewhere on the work vehicle 10 (e.g., within the suspension assembly 46) to pivotally couple components in a more compact manner. Specifically, FIG. 6 illustrates the upper ball joint assembly 67 that couples the upper arm second portion 72 of the upper control arm 56 to the steering knuckle 62 (FIG. 4). The upper ball joint assembly 67 includes a bearing 124 formed as a pair of cup races 126 that capture a ball portion 128 of a studded member 130 therebetween. The upper arm second portion 72 defines a bearing pocket 132 that directly receives the cup races 126 (i.e., in direct contact therewith) in a manner similar to that described above with respect to the joint assembly 98. Specifically, the upper arm second portion 72 also includes an internally threaded portion (not shown) located outboard the bearing pocket 132, and a retaining nut (not shown) threads into the internally threaded portion to secure the bearing 124 within the bearing pocket 132. The retaining nut can be tightened to preload the cup races 126 with a compressive preload force exerted on the ball portion 128. In some embodiments, a sleeve (not shown) is positioned between the cup races 126 to limit the preload force to a predetermined value. The upper ball joint assembly 67 similarly eliminates the need for an intermediate housing for retaining the bearing 124, and thus reduces the size of the upper arm second portion 72 as compared to traditional upper control arms that receive a unitized joint assembly having an intermediate housing. Similar joint assemblies can likewise be implemented between the lower control arm 58 and the steering knuckle 62.

Although the disclosure has been described in detail with reference to certain preferred embodiments, variations and modifications exist within the scope and spirit of one or more independent aspects of the disclosure as described.

What is claimed is:

1. A work vehicle comprising:
   a chassis defining a longitudinal axis;
   a prime mover configured to move the chassis along a ground surface in the direction of the longitudinal axis; and
   a steering assembly configured to pivot a wheel relative to the chassis about a steering axis, the steering assembly including
   a knuckle coupled to the wheel,
   a tie rod coupled to the knuckle and having a ball portion,
   a Steering cylinder slidably coupled to the chassis and configured to translate relative to the chassis along a cylinder axis perpendicular to the longitudinal axis, the steering cylinder extending longitudinally between a first side and a second side, each of the first side and the second side including a connection portion having an inner circumferential surface that at least partially defines a bearing pocket, and
   a joint assembly that couples the ball portion to at least one of the connection portions, the joint assembly including a bearing race that is received into the bearing pocket in direct contact with the inner circumferential surface, wherein the bearing race receives the ball portion, and
   wherein each connection portion further comprises an internally threaded portion located adjacent the bearing pocket and configured to receive a retaining nut.

2. The work vehicle of claim 1, wherein the bearing race comprises a first cup race and a second cup race, and wherein the ball portion is captured between the first and second cup races.

3. The work vehicle of claim 2, wherein each connection portion further comprises a shoulder located adjacent the inner circumferential surface and further defining the bearing pocket, and wherein the first cup race contacts the shoulder.

4. The work vehicle of claim 3, wherein the retaining nut is adjustable to increase a preload force exerted on the ball portion by the first and second cup races.

5. The work vehicle of claim 1, wherein each connection portion comprises a seal pocket that receives a seal member.

6. The work vehicle of claim 1, wherein each connection portion further comprises a shoulder that further defines the bearing pocket and locates the bearing race along the cylinder axis.

7. A steering subassembly comprising:
   a steering cylinder positionable within a barrel of a chassis of a vehicle and configured to translate along an axis concentric with the barrel, the steering cylinder including a connection portion comprising a seal pocket, an internally threaded portion, and a bearing pocket located between the seal pocket and the internally threaded portion and at least partially defined by an inner circumferential surface;
   a bearing race receivable into the bearing pocket in direct contact with the inner circumferential surface and configured to at least partially enclose a ball portion of a tie rod; and
   a retaining nut received into the internally threaded portion, wherein the retaining nut is adjustable to increase a preload force exerted on the ball portion by the bearing race.

8. The steering subassembly of claim 7, further comprising a seal member received into the seal pocket.

9. The steering subassembly of claim 7, wherein the bearing race comprises a first cup race and a second cup race, and wherein the ball portion is captured between the first and second cup races.

10. The steering subassembly of claim 9, wherein the connection portion further9 comprises a shoulder located adjacent the inner circumferential surface and further defining the bearing pocket, and wherein the first cup race contacts the shoulder.

11. The steering subassembly of claim 10, wherein the shoulder locates the first cup race along the axis.

12. A work vehicle comprising:
    a chassis defining a longitudinal axis;
    a prime mover configured to move the chassis along a ground surface in the direction of the longitudinal axis; and
    a steering assembly configured to pivot a wheel relative to the chassis about a steering axis, the steering assembly including
    a knuckle coupled to the wheel,
    a tie rod coupled to the knuckle and having a ball portion,
    a steering cylinder slidably coupled to the chassis and configured to translate relative to the chassis along a cylinder axis perpendicular to the longitudinal axis, the steering cylinder including a connection portion comprising a seal pocket, an internally threaded portion, and a bearing pocket defined by an inner circumferential surface and a shoulder of the connection portion,
    a seal member received into the seal pocket,
    first and second cup races received into the bearing pocket in direct contact with the inner circumferential surface, with the first cup race further in contact with the shoulder, wherein the ball portion is captured between the first and second cup races, and
    a retaining nut received into the internally threaded portion;
    wherein the retaining nut is adjustable to increase a preload force exerted on the ball portion by the first and second cup races.

13. The work vehicle of claim 12, wherein the shoulder locates the first cup race along the cylinder axis.

14. The work vehicle of claim 12, wherein the bearing pocket is located between the seal pocket and the internally threaded portion.

\* \* \* \* \*